United States Patent [19]

Heptner

[11] 4,033,383

[45] July 5, 1977

[54] THERMAL INSULATION ASSEMBLY

[75] Inventor: Peter Josef Heptner, Voerde, Germany

[73] Assignee: Diamond Power Specialty Corporation, Lancaster, Ohio

[22] Filed: Mar. 1, 1976

[21] Appl. No.: 662,668

Related U.S. Application Data

[63] Continuation-in-part of Ser. No. 535,786, Dec. 23, 1974, abandoned.

[52] U.S. Cl. .................. 138/149; 52/573; 248/49
[51] Int. Cl.² ............ F16L 9/14; F16L 3/00; E04B 1/98
[58] Field of Search ........... 52/618, 625, 455, 573; 61/16; 248/68 R, 56, 49; 138/106, 112, 113, 149

[56] References Cited

UNITED STATES PATENTS

| 980,754 | 1/1911 | Brannen | 61/16 |
|---|---|---|---|
| 997,382 | 7/1911 | Foster | 61/16 |
| 1,069,650 | 8/1913 | Scully et al. | 61/16 |
| 1,204,074 | 11/1916 | Saino | 52/618 |
| 1,307,876 | 6/1919 | Patterson | 52/618 |
| 1,363,774 | 12/1920 | Gilmore | 52/618 |
| 3,282,011 | 11/1966 | Meserole et al. | 52/618 |
| 3,432,859 | 3/1969 | Jordan et al. | 52/618 |
| 3,779,021 | 12/1973 | Green | 61/16 |

FOREIGN PATENTS OR APPLICATIONS

| 10,972 | 6/1928 | Australia | 52/618 |

Primary Examiner—James L. Ridgill, Jr.
Attorney, Agent, or Firm—Vytas R. Matas; Joseph M. Maguire

[57] ABSTRACT

An all-metallic thermal insulation assembly is constructed from a series of layers each having a plurality of spaced corrugated sheets. Each of the sheets is formed from material having a thickness $t$ and the sheets are so profiled as to provide a moment of inertia of up to 100 $t^3$ per unit length and be free of deformation except from pressure substantially in the range of 10 to 150 centimeter-kilograms per cubic centimeter and greater.

1 Claim, 4 Drawing Figures

THERMAL INSULATION ASSEMBLY

CROSS-REFERENCE TO RELATED APPLICATIONS

This is a continuation-in-part of U.S. Pat. application Ser. No. 535,786 filed Dec. 23, 1974 now abandoned.

BACKGROUND OF THE INVENTION

1. Field of the Invention

The present invention generally relates to thermal insulation elements and particularly to such elements having a plurality of layers of metallic material, formed to surround a component to be insulated.

2. Description of the Prior Art

Known thermal insulation assemblies are formed to have layers of plane-parallel foils or sheets having a low emission coefficient. Aluminum or steel is used as the material for the foils or sheets. The geometry of such insulation assemblies is such that a maximum heat barrier effect is obtained with low thermal conductivity and convection.

Thermal insulation assemblies are also known in which alternate layers of continuously corrugated sheets are spaced by plane sheets. The corrugated sheets in these assemblies serve solely as spacer members to prevent contact between the plane sheets. Such insulation assemblies, however, are able to absorb only limited forces and energy. Energy absorbing assemblies of metal thermal insulation elements make use of metal honeycombs or annular structures to transmit compressive forces, while the individual insulating sheets are maintained planar.

The advantages of the aforementioned metal insulation assemblies, especially where austenitic steel is used as the material, reside in their insensitivity to humidity, in their relative freedom from dust in comparison with non-metallic insulation materials, in their insolubility in liquids such as water containing boron, in the ease with which they can be decontaminated, and in their incombustibility. Their thermal expansion rate is moreover of the same order as that of the component to be insulated. It is therefore possible to arrange a gap in the assembly which will close in the normal operational state. Due to these named advantages, all-metal insulation assemblies can be used to great advantage in nuclear power station insulation and construction.

In the design of nuclear power stations special accident cases such as the rupture of a principal coolant line must be allowed for. In such designs it is presently accepted to provide deflection limiting devices for thermally insulated pipes in nuclear power stations. Such limiting devices are intended to withstand the reaction forces of the medium escaping the rupture location. These deflection limiting devices are situated at certain spacings from the insulated pipe to permit thermal expansion. The deflecting limiting devices must therefore be capable of absorbing not only the reaction forces of the escaping medium but also the impact loading caused by the accelerated pipe and the coolant which it contains. This impact loading can attain the same order of magnitude as that due to the reaction forces. Thus the deflection limiting device and its anchorage must be designed for twice the load. Where an insulation element of one of the aforedescribed types is used, the resultant damping is negligible, since the absorbed forces are only of the order of $10^{-4}$ to $10^{-2}$ times the loads which occur. The design of the deflection limiting devices and their anchorages for this double load, however, results in a considerable increase in the cost of construction.

SUMMARY OF THE INVENTION

According to the present invention, there is provided an energy absorbing thermal insulation assembly comprising a series of layers each having a plurality of spaced corrugated sheets of metallic material. The individual corrugated sheets in each layer are spaced apart and specifically profiled to have a depth at least equal to 5 times the sheet thickness and at most equal to 25 times the sheet thickness. This profiling allows a moment of inertia of up to 100 $t^3$ per unit length and a deformation energy substantially in the range of 10 to 150 centimeter-kilograms per cubic centimeter. The thermal insulation assembly of the present invention is capable of deforming under load to dissipate any forces arising from a rupture to be diminished by the energy required for the element deformation. The forces liberated in the case of an accidental rupture therefore do not act, or at least do not act fully, upon the deflection limiting device and its mountings. By comparison with a thermal insulation assembly of planar metal sheets, of which the moment of inertia equals $t^3/12$, the energy absorbed in the deformation of a thermal insulation assembly embodying the present invention is greater by 3 to 4 powers of 10.

The present invention may be embodied in different forms of construction. The individually spaced profiled sheets of each layer may be designed and disposed solely for elastic deformation. In such a case the directions of the sheet corrugations in adjacent layers are made to cross one another. With this arrangement, the maximum possible energy is absorbed in the case of impact loading by the work done in deforming the individual sheets in the plastic region. The web dimensions are chosen to insure that the webs between the corrugations will buckle. Corrugation buckling is particularly desirable to fully utilize the strain paths available due to deformation. The high degree of stiffness, which can be achieved in this manner makes possible a bending load of the individual sheets which enables a somewhat increased resilient deflection and better thermal insulation to be attained. To achieve the maximum possible degree of thermal insulation, the contact points between the individual corrugated sheets in each layer are minimized. To accomplish this, each sheet is spaced apart from the adjacent sheets in the layer. Further, the configuration of each sheet is such as to provide a pair of substantially vertical end tabs which extend higher than the webbing or corrugation height formed between the end tabs of each sheet.

To simplify the construction, the energy absorbing thermal insulation assembly can be restricted to certain critical pressure points around the periphery of the component to be insulated. These critical pressure points may then be joined together by thermal insulation utilizing only planar sheets to provide a thermal insulation assembly which is also an energy absorbing assembly.

DESCRIPTION OF THE PREFERRED EMBODIMENT

Figure 1:
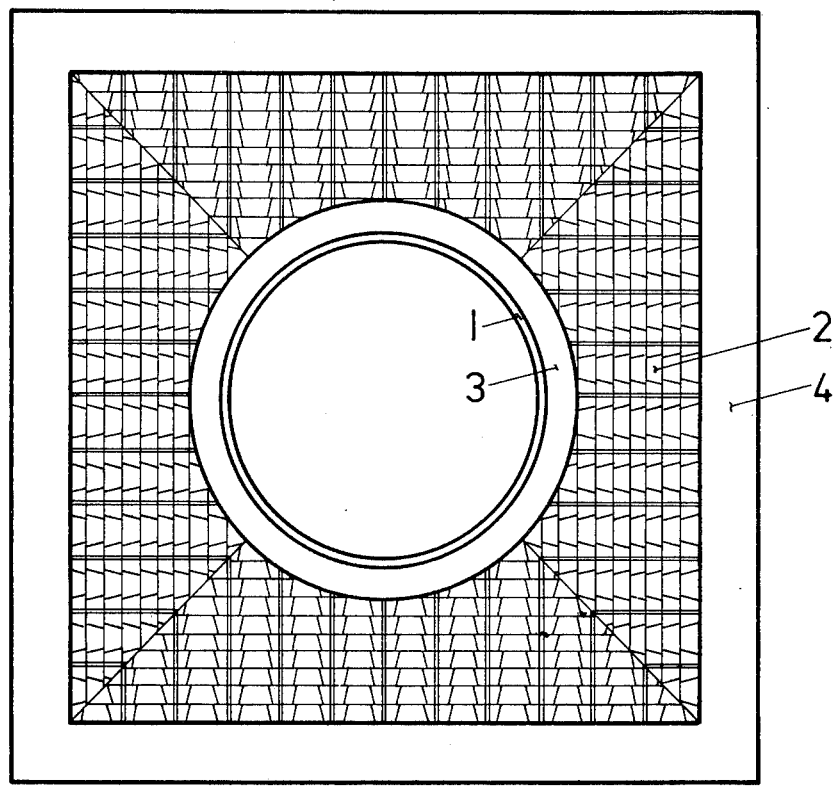
FIG. 1 illustrates a thermal insulation assembly embodying the present invention.

Referring now to the drawings, a duct 1 is shown disposed inside a safety vessel of a nuclear power station (not shown) and serves the station by conducting cooling water to the reactor (not shown). The duct 1 is surrounded by a spaced metallic insulation assembly 2. The space 3 left clear between the duct 1 and the insulation assembly 2 permits free thermal expansion of the duct 1. On the side remote from the duct 1, the thermal insulation assembly 2 is enclosed by a deflection limiting device in the form of a structural frame 4.

The insulation assembly 2 comprises a series of aligned layers of insulation each layer having a plurality of spaced profiled sheets 5 spaced from each other within each layer and thusly arranged in several layers or planes. In the preferred embodiment, the individual spaced sheets 5 are formed to have trapezium-shaped corrugations and vertical end tabs. The direction of the corrugations of the sheets 5 in two adjacent layers or planes are made to cross one another as may be best seen in FIG. 2. The height of the corrugations of each of the individual sheets 5 are made to be less that the height of the vertical end tabs to reduce the number of contact points between layers and thereby keep the thermal bridges between layers to a minimum. The individual sheets 5 can also be laid on or welded to planar sheets 6. In this case, the corrugations of adjacent layers may also be oriented in the same direction as is best seen in FIG. 3.

Figure 4:
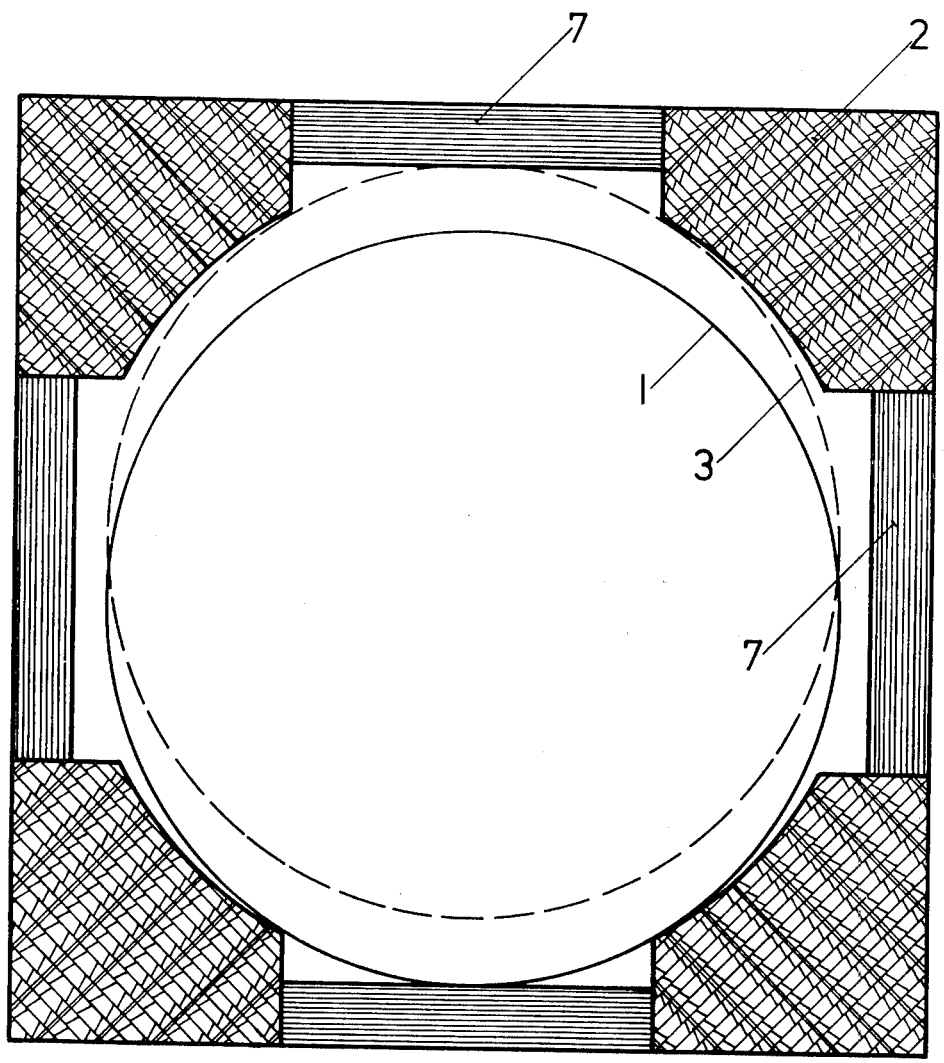
FIG. 4 illustrates a second embodiment of the present invention.

It is not necessary in every case for the energy-absorbing thermal insulation assembly of profiled sheets 5 to surround the entire periphery of the component to be insulated. In the embodiment shown in FIG. 4, the energy-absorbing insulation assembly 2 is mounted only to the four corner points with the layers of profiled sheets 5 extending diagonally across the corners of each of the four corner points. Each corner insulation assembly 2 is constructed according to the criteria described previously for good energy absorption. The corner insulation assemblies 2 are then connected together by a metal insulation assembly 7 of known type comprising vertically spaced planar metal sheets arranged with the assembly 2 in such a manner as to complete the surrounding of the duct 1 by thermal insulation. In this case, the forces arising from a duct rupture are adequately absorbed by the energy-absorbing insulation assemblies 2 located at each of the four corners and a lighter weight total assembly is provided which takes advantage of the planar sheet thermal insulation assembly 7.

Figure 2:
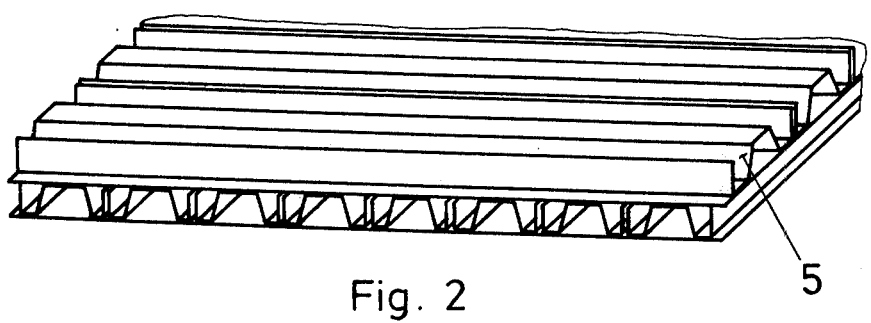
FIG. 2 and 3 illustrate alternative arrangements of the metallic sheets within adjacent layers of the thermal insulation assembly.
Figure 3:
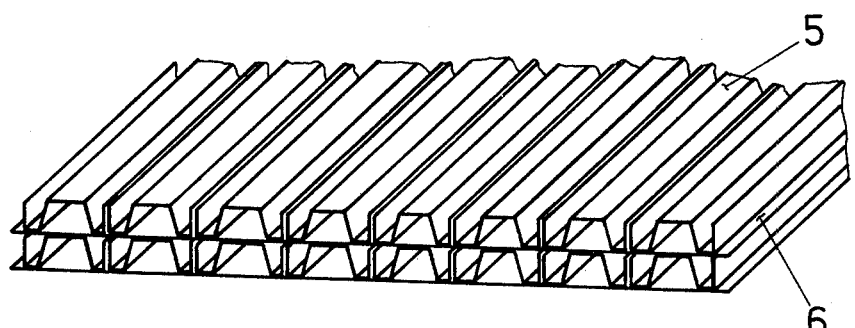

To provide maximum energy absorption the profiled sheets 5 shown in FIGS. 2 and 3 in the preferred embodiment are formed to have a section depth of 9 millimeters and a sheet thickness of either 0.8 or 0.4 millimeters.

The Applicant tested insulation assemblies having a thickness of 3 to 7 centimeters. The insulation assemblies were compressed through 1.8 to 5 centimeters. Energies of 18 to 102 kilogram-centimeters per cubic centimeter were absorbed. Thermal insulation assemblies constructed in accordance with the present invention should therefore be capable of absorbing the energy liberated in an accident within the design limits.

Although the described embodiments relate to a duct inside the safety vessel of a nuclear power station, the invention is equally applicable to other cases in which all-metal insulation elements are used.

Within the scope of the conditions hereinbefore defined, the thickness of sheet, depth of profile, profile shape and the relative disposition of the individual profiled sheets (with the profiles parallel to or crossing one another) may be varied to suit the space available and the compression forces to be supported in each particular case.

What I claim is:

1. A thermal insulation assembly for enclosing a pressurized duct within an enclosure having four corners comprising:

a pressurized duct;

an enclosure formed around said duct to have four corners;

corrugated energy absorbing insulating means formed at each corner of said enclosure to have a series of layers for insulating the corners of said enclosure and for allowing the enclosure to absorb the forces arising from a rupture of the pressurized duct, each of said series of layers being formed by a plurality of aligned corrugated metal sheets spaced from each other and extending diagonally across each of the corners of the enclosure to minimize thermal conductivity therebetween; and a series of spaced planar sheets extending between adjacent corrugated insulating means to thermally insulate the pressurized duct along the remainder of the enclosure not insulated by said corrugated insulating means to completely surround said duct by thermal insulation.

* * * * *